United States Patent [19]

Hall et al.

[11] Patent Number: 4,555,220
[45] Date of Patent: Nov. 26, 1985

[54] REGENERATION SYSTEM FOR A HYDRAULIC INTENSIFIER UNIT

[75] Inventors: Richard W. Hall; Sven Sonnenberg, both of Springfield; Harbhajan S. Mahal, Dayton, all of Ohio

[73] Assignee: Towler Hydraulics, Inc., Milwaukee, Wis.

[21] Appl. No.: 343,141

[22] Filed: Jan. 28, 1982

Related U.S. Application Data

[63] Continuation of Ser. No. 92,245, Nov. 7, 1979, abandoned.

[51] Int. Cl.$^4$ ............................................. F04B 17/00
[52] U.S. Cl. ..................................... 417/342; 417/346
[58] Field of Search ................ 417/342, 344, 345, 346

[56] References Cited

U.S. PATENT DOCUMENTS

| | | | |
|---|---|---|---|
| 3,773,438 | 11/1973 | Hall et al. | 417/346 X |
| 3,981,622 | 9/1976 | Hall et al. | 417/346 X |
| 3,994,627 | 11/1976 | Calzolari | 417/342 X |

FOREIGN PATENT DOCUMENTS

| | | |
|---|---|---|
| 1220178 | 1/1971 | United Kingdom . |
| 1313876 | 4/1973 | United Kingdom . |
| 1322168 | 7/1973 | United Kingdom . |

*Primary Examiner*—Richard E. Gluck
*Attorney, Agent, or Firm*—Biebel, French & Nauman

[57] ABSTRACT

A hydraulic intensifier for oil well fracturing and/or erosion drilling, having a pair of intensifier units including a pair of sequentially operated reciprocating ram assemblies powered by hydraulic cylinder motors which are operated to maintain a substantially uniform output fluid pressure from the intensifier unit. Each cylinder motor is supplied from a main source of hydraulic fluid under high pressure which operates on the working faces of the pistons of the cylinder motors. Hydraulic fluid is also supplied to the return face side of each piston in the hydraulic cylinder motor. The return face side of the pistons have a smaller operative area than the working face sides and each can be connected to the main source of supply of hydraulic fluid to the working faces so that as the pistons are driven to their extended positions by application of hydraulic pressure to the working face, the fluid on the return face side can be expelled from the cylinder motors and returned to the working face side to either reduce the fluid flow from the source while maintaining the same cycling rate or maintaining the same flow from the source by increasing the cycling rate and thus increasing the total volume flow. An adjustable pressure relief valve is provided to permit control of the pressure in the well to a maximum desired limit by relieving pressure of the infeed fluid to the hydraulic cylinder motors.

9 Claims, 2 Drawing Figures

REGENERATION SYSTEM FOR A HYDRAULIC INTENSIFIER UNIT

This is a continuation of application Ser. No. 092,245 filed Nov. 7, 1979 now abandoned.

BACKGROUND OF THE INVENTION

1. Field of the Invention

The present invention relates to hydraulic intensifier units for use in oil well stimulation such as is employed for fracturing geological formations adjacent deep well bores and for erosion drilling and the like.

2. Prior Art

Apparatus of the type to which the present invention relates are disclosed, for example, in U.S. Pat. No. 3,773,438 and 3,981,622. The basic principle of operation of such devices is to use a pair of hydraulic cylinder motors each associated with a ram to which is supplied the fluid to be pumped into a well at high pressures for fracturing the substrata. Each of the hydraulic cylinder motors is provided with a high volume of hydraulic fluid through a controlled valving arrangement which sequentially drives the respective pistons of the hydraulic cylinder motors to their extended positions, which in turn, through piston rods, forces the rams forward to expel a fluid into the well.

In addition, these devices are provided with a precompression valving arrangement which pressurizes the working face side of the pistons of the cylinder motors when they are in the retracted position, prior to their being forced forward by the main source of hydraulic fluid. This precompression assists in maintaining uninterrupted pressure on the fluid being forced into the well, by maintaining a smooth transition from pressure being applied alternately by the two cylinder motors. As the piston of one cylinder motor is being moved forward in its working stroke the opposite piston is being returned to its retracted position and the ram is filled with fluid to be pumped into the well. In the retracted position a small volume remains on the working face side of the hydraulic cylinder motor which is then precompressed in order to precompress the fluid in the ram for smooth transition from one ram to the other to maintain constant pressure on the fluid being pumped into the well, as is mentioned above.

The sequential operation of both rams is controlled through pneumatic and hydraulic fluid control systems as described in each of the above referred to patents. In addition, the two patents referred to above describe two different means of returning the pistons in the cylinder motors to their initial starting positions. The first patent discloses a pair of return hydraulic cylinder motors associated with each of the power rams which act upon the rams after completion of their power stroke to return the rams to their retracted position. The second referred to patent utilizes compressed air on the return face side of each piston of the hydraulic cylinder motors which, upon completion of the power stroke of the respective piston, returns the piston to its initial starting position.

The primary operating limitation on the cycling speed of the intensifier unit, which necessarily limits the amount of fluid which can be pumped into a well, is the volume of hydraulic fluid which in a given time, can be supplied by the hydraulic fluid source to the working faces of the hydraulic cylinder motors. The source of fluid supply is generally a series of pumps operated by relatively high horsepower diesel engines. Thus, when the pumps are operating at maximum throughput the maximum rate of flow of hydraulic fluid to the cylinder motors is attained which in turn limits the speed the pistons and their respective rams can be moved forward and thus limits the volume of fluid per rate of time that can be pumped.

In the past, it has been possible to adjust the cycle of operation of the intensifier unit by changing the size of the pistons in the rams and by inserting sleeves in the rams to reduce the volume of fluid pumped into the well on each stroke while increasing the pressure.

It is generally advantageous to pump at as high a fluid flow rate as possible in order to fill the cavity of the well in the shortest time possible. However, with limitations on the pressure of the hydraulic fluid due to the practical limitations of the source of supply, as mentioned above, the pressure which can be generated at maximum fluid pumping rate may not be sufficient to fracture the substrata. It then becomes necessary to change the pistons and sleeves in the rams to decrease the area of the piston and the volume in the ram so as to increase the pressure. This also, however, decreases the rate of fluid flow from the rams. In the past, it has been necessary to physically change the pistons in the rams and insert or remove sleeves which increases or decreases the volumes in the rams in order to achieve this dual purpose of maximum rate of fluid flow and high pressure needed to fracture some geological formations.

SUMMARY OF THE INVENTION

The present invention is an improvement over the above described apparatus, which eliminates the necessity for physically replacing the pistons and other parts of the rams in order to achieve either a high fluid flow pumping rate or a relatively higher pressure on the fluid being pumped into the well.

This is accomplished by utilizing a regeneration system which, through a control valve and conduit arrangement, extracts hydraulic fluid from the return face side of the pistons of the hydraulic cylinder motors during the power stroke, and pumps this fluid into the working face side of the hydraulic cylinder motors along with the main source of hydraulic fluid. This decreases the amount of fluid required from the source in order to move the pistons from their retracted positions to their extended positions and thus increases the cycling rate of the intensifier unit. The regeneration system may be optionally cut out through operation of the control valve, and the hydraulic fluid dumped into a tank so that maximum pressure can be achieved, when this is desired.

Each piston in the hydraulic cylinder motors is mounted or formed on the end of a piston rod which engages the ram at the opposite end thereof. The piston rod has a predetermined diameter, less than the diameter of the piston, so as to provide a free volume within the cylinder motor on the return face side of the piston, which can be filled with hydraulic fluid during the return stroke. The area of the working face of the piston is greater than the operative area of the return face side of the piston in accordance with the difference between the diameter of the piston rod and the diameter of the piston.

By coupling the return face side of each cylinder motor to the working face side so as to equalize the pressures on both sides of the pistons, the force applied by the piston rods to the plungers of the respective rams is reduced because of the reduction in the effective piston diameter. Thus, although the cycling rate of the hydraulic cylinder motors can be increased for a given maximum available pressure on the main source of hydraulic fluid because of the additional fluid flow created by the regeneration system, the available pressure for pumping fluid into the well is reduced. However, when maximum pressure is desired the regeneration system can be rendered inoperative and maximum available pressure applied to the plungers of the rams.

When the regeneration system is inoperative the pressure of the hydraulic fluid on the return face side of the pistons is substantially reduced and the fluid is dumped to a low pressure container so that effectively the entire working face of the piston is the operative area upon which the pressure of the hydraulic fluid acts on the power stroke. Thus, the present system permits maximum fluid flow from the rams into a well during operation of the regeneration system, and if an increase in pressure is required in order to fracture the walls of the well, the regeneration system can be eliminated, permitting maximum pressure to be applied through the hydraulic cylinder motors to the rams. This diversity provides substantial advantages over prior art devices which require disassembly of the rams and changing several components thereof in order to accomplish the dual operations which permits high fluid flow or high pressure, as desired.

As mentioned above, the pressure on the main source of hydraulic fluid to the cylinder motors is limited by the capabilities of the supply pumps. This, in turn, limits the pressure which can be applied to the fluid being pumped into the well both under normal operating conditions and during use of the regeneration system. However, it is sometimes necessary and desirable to limit the pressure on the fluid in the well to a different maximum pressure or to be certain that higher peak pressures are not attained which might cause damage to the equipment. Because of the corrosive and/or abrasive nature of the fluid being pumped into the well it is difficult to economically, accurately and reliably measure and control directly the fluid pressure with conventional pressure measuring and control equipment in order to limit the maximum pressure in the well. Further, since with the present invention the pressure ratio between the pressure on the fluid being pumped into the well is not the same during use of the regeneration cycle and without it, using a pressure control device on the hydraulic cylinder motor calibrated to indicate and limit the corresponding pressure on the well fluid will only be accurate when the unit is operating in the mode to which the device is calibrated. In the other mode of operation of the present invention the control device will be inaccurate.

In the present invention, however, a means has been devised for limiting the pressure in the well to a desired maximum regardless of which mode the system is operating in. This is accomplished by a pressure limiting device located on the main fluid supply line of the hydraulic cylinder motors which is operable to meter the fluid flow to the cylinder motors in either mode of operation and is adjustable in either mode to provide a desired well fluid pressure in the rams on the basis of a calibration scale on the device which is accurate for both modes.

In this device, a stepped piston is utilized in conjunction with an automatic valve switching and cut off system to vary the effective piston area on which the source fluid acts to counteract an adjustable spring force calibrated to corresponding pressures of the fluid being pumped to the well. As the pumping system of the present invention is switched from its normal operating mode to the regeneration cycle and vice versa, a valve in the main fluid source supply line is simultaneously switched to direct the fluid against the appropriate piston area so that the calibration on the device will continue to be accurate.

DETAILED DESCRIPTION OF THE PREFERRED EMBODIMENT

Since the present invention relates mainly to a regenerative system which has been incorporated into a hydraulic intensifier unit of the type disclosed in the above two referred to U.S. patents, a detailed explanation of the over all operation and valve components, including the pneumatic control circuitry, are not included in the present description and reference should be made to the above referred to patents for the details of operation of both the hydraulic and pneumatic control circuits, which patents are hereby incorporated herein by reference thereto.

Figure 1:
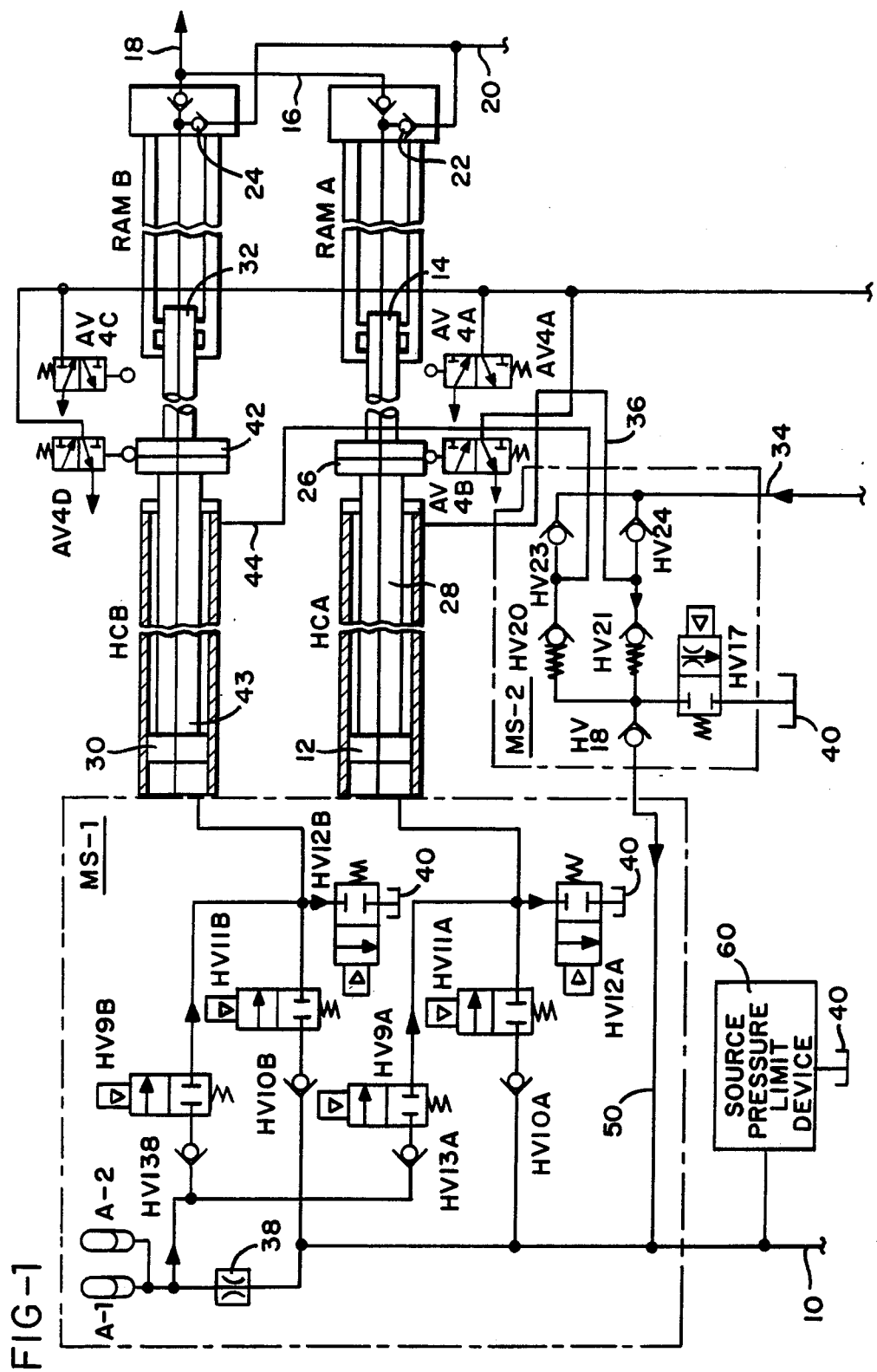
FIG. 1 is a schematic illustration of a hydraulic intensifier unit utilizing a pair of rams and an associated pair of hydraulic cylinder motors, and incorporating the regeneration system of the preferred embodiment of the present invention.

The valving system which directly controls the supply of hydraulic fluid from the source line 10 to hydraulic cylinder motors HCA and HCB which in turn respectively operate ram A and ram B, is contained within box MS1 of FIG. 1. The regenerative system of the present invention has its main control valves illustrated in box MS2 of FIG. 1.

Referring first to the operating components in box MS1, assuming that ram A is the first to be activated by driving it to the right, as shown in FIG. 1, valves HV9A and HV12A are positioned closed, as shown in FIG. 1, and the valve HV11A is moved to the open position to permit passage of fluid from the main source of hydraulic fluid coming through line 10, to the working face side of piston 12 in hydraulic cylinder motor HCA. This in turn causes the plunger 14 in ram A to expel liquid through line 16 to line 18 where it is carried to the well (not shown). The fluid which is pumped into the well, and which is usually highly abrasive, corrosive or both, is supplied to rams A and B from a pressurized source of supply (not shown) and is pumped through line 20 with check valves 22 and 24, into the rams.

As piston 12 reaches its extended position at the end of the power stroke, the collar 26 on piston rod 28 opens valve AV4A which opens valve HV11B which admits high pressure hydraulic fluid from the main source through line 10 to the working face side of piston 30 in hydraulic cylinder motor HCB. Opening of valve HV11B, in turn, closes valve HV11A which, in turn, opens valve HV12A. The hydraulic fluid acting against piston 30 causes it to move forward which in turn causes plunger 32 of ram B to expel fluid through the line 18 to the well.

As ram B is operated as described above for movement from its retracted position, as shown in FIG. 1, to its extended position, piston 12 is returned to its retracted position. This is accomplished through use of a relatively low pressure hydraulic fluid being pumped through line 34 and passed through check valve HV24 and then through line 36 directly into the return face side of hydraulic cylinder motor HCA. As piston 12 is returned to its retracted position collar 26 activates pneumatic control valve AV4B. This, in turn, closes HV12A which, in turn, opens precompression valve HV9A which supplies fluid to the small remaining volume on the working face side of piston 12 in hydraulic cylinder motor HCA, to precompress this volume prior to the opening of valve HV11A which connects the main source of fluid supply to motor HCA. Also, as piston 12 returns to its retracted position it expels fluid through valve HV12A, which has been previously opened as described above, thus permitting fluid to be dumped into the tank 40 from which it can be recirculated.

As piston 30 reaches its extended most position the collar 42 on piston rod 43 activates pneumatic control valve AV4C which opens valve HV11A to introduce high pressure hydraulic fluid from line 10 to the working face side of piston 12. After valve HV11A is opened, valve HV11B is closed which cuts off high pressure hydraulic fluid from the working face side of piston 30. Valve HV12B is then opened which permits hydraulic fluid in the hydraulic cylinder motor HCB to be dumped into tank 40 on the return stroke of piston 30. When the valve HV12B is opened the pressure is relieved from the hydraulic cylinder motor HCB and the low pressure fluid on the return face side of hydraulic cylinder motor HCB, which comes from line 34 through valve HV23 and line 44, returns the piston 30 to its retracted position and expels the hydraulic fluid from the working face side of hydraulic cylinder motor HCB to the tank 40.

As piston 30 reaches its retracted position collar 42 activates pneumatic control valve AV4D which in turn closes valve HV12B and opens the precompression valve HV9B to precompress the small free volume in hydraulic cylinder motor HCB with hydraulic fluid from accumulators A1 and A2, as described above in connection with hydraulic cylinder motor HCA.

Precompression of cylinder motors HCA and HCB assists in providing a more uniform pressure on the output fluid from the intensifier unit. The fluid used in precompressing both of the hydraulic cylinder motors HCA and HCB is provided from accumulators A1 and A2 which are in turn supplied with fluid from the main fluid source through a restrictive orifice 38 in line 10. The accumulators A1 and A2 are maintained under operating pressure, preferably the same as the pressure from the source line 10.

The sequence described above is generally the normal operating sequence of the prior art devices as referred to in the U.S. patents mentioned, and is also the sequence of operation of the present invention when the hydraulic valve HV17 is open. When valve HV17 is open the hydraulic fluid on the return face side of both of the hydraulic cylinder motors HCA and HCB is expelled to storage tank 40 as the pistons 12 and 30 move to the extended position and expel hydraulic fluid from the hydraulic cylinder motors.

However, when valve HV17 is moved to the closed position, as illustrated in FIG. 1, the fluid expelled from either hydraulic cylinder motor as its respective piston is moved forward, is passed through the valving unit MS2 and returned to the line 10 through line 50 to supply additional fluid, and thus increase the rate of fluid flow, to whichever hydraulic cylinder motor is being operated. For example, if piston 12 is moving from its retracted position to its extended position hydraulic fluid on the return face side of the piston will be expelled through line 36 and pass through check valves HV21 and HV18 and through line 50 to be combined with the fluid in line 10 which in turn will pass through the valves HV10A and HV11A to the working face side of hydraulic cylinder motor HCA. This regeneration cycle increases the rate of fluid flow being supplied to the working face side of hydraulic cylinder motor HCA and thus speeds up the movement of piston 12 from its retracted to its extended position.

Likewise, when hydraulic cylinder motor HCB is operative and piston 30 is moving from its retracted position to its extended position, hydraulic fluid will be expelled from the return face side of the hydraulic cylinder motor HCB through line 44 and pass through check valves HV20 and HV18 and through line 50 to be combined with the fluid in line 10 coming from the main hydraulic fluid source. The fluid will then pass through valves HV10B and HV11B to the working face side of hydraulic cylinder motor HCB.

Since the pressure in the fluid coming from the return face side of either of the hydraulic cylinder motors HCA or HCB during the regeneration cycle must essentially be the same as the pressure of the hydraulic fluid in line 10 coming from the main hydraulic fluid source, the effective area of the pistons is reduced to the cross sectional area of the piston rods 28 and 43 for the respective hydraulic cylinder motors. Thus, although additional fluid is supplied, it is supplied, to increase the rate of fluid flow with an effective lower pressure so far as the pressure which can be applied to the plungers 14 and 32 which operate rams A and ram B. This in effect reduces the pressure at which the operating fluid can be supplied through line 18 to the well, although the fluid can be supplied at a faster rate since hydraulic cylinder motors HCA and HCB can be operated at a faster rate due to the increased volume per unit of time of hydraulic fluid being supplied to their working face sides.

When it becomes necessary to supply fluid at a greater pressure, hydraulic control valve HV17 is opened so that the hydraulic fluid on the return face sides of the hydraulic cylinder motors is expelled to the tank 40 through a restricted orifice which causes a much lower pressure in the hydraulic fluid than the main fluid supply source. This, in effect, increases the operative area on the working faces of the pistons, and since additional fluid is not being provided to the working face side of the hydraulic cylinder motors because it is being dumped into the tank 40 rather than returned to line 10, the speed of operation during the forward movement of the pistons of the hydraulic cylinder motors HCA and HCB is reduced.

Thus the device of the present invention permits dual mode operation of an intensifier unit without the necessity of changing pistons and inserting sleeves, etc., as was required in prior art devices and which obviously requires substantial down time in order to make the necessary changes. With the present invention, however, all that need be done is to operate hydraulic control valve HV17 to provide regeneration for the system, as requirements demand.

In addition, it is contemplated that automatic control of hydraulic control valve HV17 may be utilized in response to operating characteristics. For example, if the regeneration system is beint utilized to pump fluid into the well and the intensifier unit is stalled due to insufficient pressure to fracture the substrata of the well, hydraulic control valve HV17 may be automatically shifted to the open position to increase the pressure in order to fracture the surfaces in the well.

As previously mentioned, since it is desirable to control the maximum pressure on the fluid being pumped into the well, means must be provided which can sense the pressure in both the normal operating mode and during the regeneration cycle. In the present invention the pressure limiting device 60, illustrated in FIG. 2, was devised to permit proper adjustment of the pressure by use of a single control valve regardless of which operating mode the system is in. The pressure limiting device 60 is in communication with the source line 10, as shown in FIG. 1, and relieves the pressure in line 10 by dumping fluid to the tank 40 when the pressure reaches a predetermined level.

Figure 2:
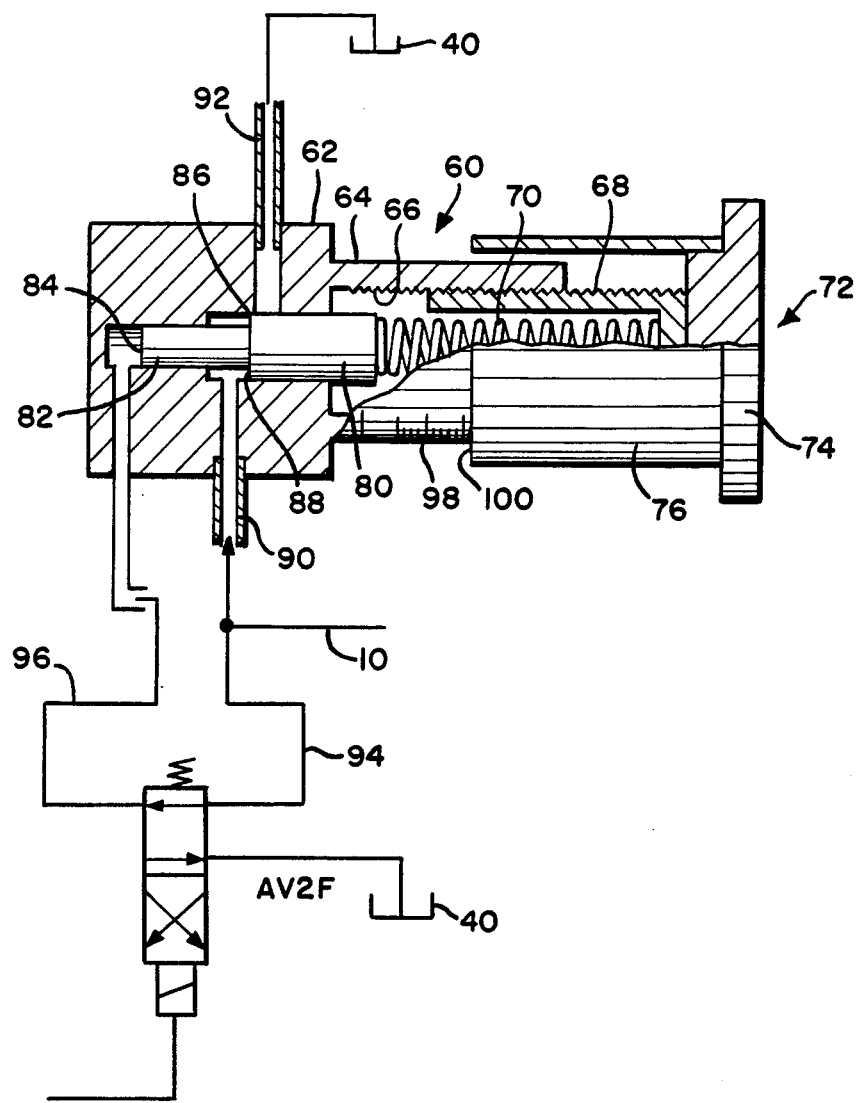
FIG. 2 is a cross sectional side view through the hydraulic fluid source pressure limiting device with schematically illustrated pneumatic control means.

As shown in FIG. 2, the device basically comprises a main housing portion 62 having a cylindrical extension 64 with internal threads 66 which are matingly engaged by the correspondingly externally threaded cylindrical member 68. Member 68 is provided with an internal cylindrical cavity for housing compression spring 70 and is secured to a cylindrical cap 72 comprised of a stepped, disc-shaped member 74 to which is secured a cylindrical shell 76 which extends over the outer end of the cylindrical extension 64.

A piston 80 is positioned in a corresponding cylindrical cavity in main body portion 62 concentric with the compression spring 70 which presses against the end of piston 80. The piston 80 is stepped and has smaller end 82, presenting a face 84. An additional face 88 formed by a step in the piston 80 is exposed to fluid pressure through conduit 90, which is further connected to line 10. Face 84 can also be exposed to the fluid source through valve AV2F. A plurality of cylindrical passageways are formed in the main body portion of the device 60 for permitting fluid flow therethrough. The connecting line 90 receives fluid directly from the source line 10 and supplies it directly to the face 88 of the piston 80. The force produced by action of this fluid on the piston 80 is counteracted by the force of compression spring 70. If the fluid force is sufficient to overcome the spring force the piston is moved to the right, as seen in FIG. 2, so that fluid from the source line 10 will be discharged through conduit 92 to tank 40.

The smaller piston diameter of face 88 is associated with operation of the system in the regeneration mode. When the system is in the normal mode the pneumatic control valve AV2F, which is operated by the pneumatic control system, is maintained in the position illustrated in FIG. 2 so that fluid from the source line 10 directed against the face 88 of the piston 80 will also be passed through the conduit 94 to the valve AV2F, and acts on the face 84 of piston 82. However, when the system is switched to the regeneration mode, valve AV2F is moved upwardly, as viewed in FIG. 2, so that the conduit 94 is blocked by the valve from connection to the conduit 96. When this occurs, the force acting against the compression spring 70 is produced by the pressure on face 88 only of piston 80 and is thus smaller than it would be by supplying combined pressure to the faces 84 and 88 in the normal operating mode.

A calibration scale 98 is provided on the side of the cylindrical extension 64. The leading edge 100 of the shell 76 is used as the marker for alignment with the appropriate notch on the calibration scale 98 to obtain the desired limiting pressure in the well for either mode of operation of the system. Thus, by simple engineering calculations, the output pressure from the rams can be correlated to the input pressure from the source line 10 to the hydraulic cylinder motors HCA and HCB through proper calibration of the scale 98 as well as sizing of the piston faces 84 and 88, and appropriate force and spring rate of compression spring 70. When the desired pressure has been set on the calibration scale through rotation of the cap 72, if the source pressure exceeds this desired established limit it will move the piston 80 sufficiently to the right, as illustrated in FIG. 2, to permit the fluid from the source line 10 to be passed through the conduit 92 to the tank 40 and thus maintain the proper pressure in the supply line to the hydraulic cylinder motors HCA and HCB which, in turn, will produce the desired pressure on the fluid in the rams and in the well.

Although the foregoing illustrates the preferred embodiment of the present invention, other variations are possible. All such variations as would be obvious to one skilled in this art are intended to be included within the scope of the invention as defined by the following claims.

What is claimed is:

1. In a hydraulic intensifier unit for use in oil well fracturing, erosion drilling or the like, in which a pair of working rams are sequentially operated by a corresponding pair of hydraulic cylinder motors each having a piston forming a working face side and an opposed return face side of lesser operative area than said working face side, a source of hydraulic fluid for supplying fluid to said working face side of said motors, and said pistons of said motors being movable between retracted and extended positions, the improvement comprising:
   valve means connecting said hydraulic cylinder motors with said fluid source for selectably (1) receiving fluid from said return face side of said motors and supplying it to said source for increasing fluid flow from said source to the working face side of said motors during movement from said retracted position to said extended position, or (2) for expelling fluid from said return face side and not returning it to said source during movement from said retracted position to said extended position; and
   means for supplying hydraulic fluid to said return face side of said motors to move said pistons to said retracted position.

2. A hydraulic intensifier unit as defined in claim 1 wherein said means for supplying fluid to said return face side of said motors, includes:
   first conduit means for connecting said fluid source to said working face side of said motors;
   second conduit means for connecting said return face side of said motors to said valve means;
   third conduit means for connecting said valve means to said first conduit means;
   a lower pressure fluid supply source for supplying fluid at a lower pressure than said fluid source to said second conduit means; and
   further valve means connecting said lower pressure fluid supply to said second conduit means for passing said lower pressure fluid to said second conduit means when said pistons are in said extended position and fluid pressure on said return face side of said motors is at said lower pressure, and for preventing higher pressure fluid from passing to said lower pressure fluid supply means.

3. A hydraulic intensifier unit as defined in claim 1 wherein said valve means supplies said fluid from said motors to said source at substantially the same pressure as said source supplies fluid to the working face side of said motors.

4. A hydraulic intensifier unit as defined in claim 2, including:
   accumulator means connected to said fluid source through means defining a restricted orifice to bleed off a portion of the output of said source;
   additional valve means responsive to the return of each of said motors to their corresponding retracted positions and connecting said motors to said accumulator means for precompressing said motors prior to the initiation of direct application of fluid from said source; and
   means responsive to the approach of each of said pistons of said cylinder motors to their extended positions for applying fluid from said source to the other motor which has been precompressed in its retracted position, so that the output pressure of the intensifier unit remains substantially uninterrupted.

5. A hydraulic intensifier unit as defined in claim 1, including:
   means limiting pressure of fluid being supplied to a well to a predetermined maximum pressure, by limiting the pressure on said fluid from said hydraulic fluid source to said motors when said valve means is in either of said selectable positions.

6. A hydraulic intensifier unit as defined in claim 5 wherein said pressure limiting means includes:
   a housing having
      a first passageway connected to said fluid source,
      a second passageway connected to a fluid discharge means;
   piston means movable in said housing to selectably interconnect said first and second passageways and having at least two separate faces selectably exposable to said fluid from said fluid source;
   control valve means for applying fluid from said fluid source to one or both of said piston faces; and
   spring means for adjustably applying force to said piston to counteract pressure of said fluid from said source up to a predetermined level at which said piston will move to interconnect said first and second passageways.

7. A hydraulic intensifier unit as defined in claim 6, wherein a first of said piston faces is provided with an area upon which said fluid from said fluid source acts to correspond to pressure on fluid being pumped into said well when said valve means is positioned to return fluid from said return face side to said working face side, and a second of said faces is provided with an area which in combination with the area of said first face corresponds to pressure on fluid being pumped into said well when said valve means is positioned to expel fluid from said return face side.

8. A hydraulic intensifier unit as defined in claim 7 wherein said spring means includes:
   calibration means having indications of fluid pressure in said well at corresponding limiting spring force on said piston for counteracting said pressure of said fluid source, and being adjustable to vary said spring force to a corresponding indication of said well fluid pressure.

9. In a hydraulic intensifier unit for use in oil well fracturing, erosion drilling or the like, in which a pair of working rams are sequentially operated by a corresponding pair of hydraulic cylinder motors each having a piston forming a working face side and an opposed return face side of lesser operative area than said working face side, a source of hydraulic fluid for supplying fluid to said working face side of said motors, and said pistons of said motors being movable between retracted and extended positions, the improvement comprising:
   pressure limiting means, including;
      a housing having;
      a first passageway connected to said fluid source;
      a second passageway connected to a fluid discharge means;
      piston means movable in said housing to selectably interconnect said first and second passageway and having at least two separate faces selectably exposable to said fluid from said fluid source;
      control valve means for applying fluid from said fluid source to one or both of said piston faces; and
   spring means for adjustably applying force to said piston to counteract pressure of said fluid from said source up to a predetermined level at which said piston will move to interconnect said first and second passageways.

* * * * *